(12) United States Patent
Takeuchi

(10) Patent No.: US 7,994,687 B2
(45) Date of Patent: Aug. 9, 2011

(54) PIEZOELECTRIC ACTUATOR AND METHOD FOR DRIVING THE SAME

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 527 days.

(21) Appl. No.: 12/133,609

(22) Filed: Jun. 5, 2008

(65) Prior Publication Data

US 2008/0303380 A1    Dec. 11, 2008

(30) Foreign Application Priority Data

Jun. 7, 2007    (JP) ................................ 2007-151059

(51) Int. Cl.
*H01L 41/08*    (2006.01)
(52) U.S. Cl. ............... 310/317; 310/323.02; 310/323.14
(58) Field of Classification Search .................. 310/328, 310/317, 323.01, 316.01–316.02, 323.02, 310/323.21, 323.14; *H01L 41/08, 41/09*
See application file for complete search history.

(56) References Cited

U.S. PATENT DOCUMENTS

| | | | | |
|---|---|---|---|---|
| 6,064,140 A * | 5/2000 | Zumeris | ................... | 310/323.02 |
| 7,116,038 B2 * | 10/2006 | Miyazawa et al. | ....... | 310/323.02 |
| 7,253,552 B2 * | 8/2007 | Miyazawa et al. | ....... | 310/323.02 |
| 2004/0027032 A1 * | 2/2004 | Moteki et al. | ............ | 310/323.02 |
| 2004/0256957 A1 * | 12/2004 | Miyazawa | .................... | 310/328 |

FOREIGN PATENT DOCUMENTS

| | | |
|---|---|---|
| JP | 2004-222377 | 8/2004 |
| JP | 2004-266943 | 9/2004 |

* cited by examiner

*Primary Examiner* — Thomas M Dougherty
*Assistant Examiner* — Karen Addison
(74) *Attorney, Agent, or Firm* — Harness, Dickey & Pierce, P.L.C.

(57) ABSTRACT

The piezoelectric actuator includes a piezoelectric element structure (100) which has at least one piezoelectric element (120), and a working edge (130) for directing driving force on a driven body (MB), wherein the working edge (130) oscillates in response to deformation of the piezoelectric element (120). The piezoelectric actuator further includes a driver circuit (300) for applying voltage to the piezoelectric element (120); and a drive control circuit (200) for inducing oscillation of the working edge (130) by supplying a drive signal (DV, #DV) of rectangular waveform to the driver circuit (300). The drive control circuit (200) is capable of reversing the drive direction of the driven body (MB) by changing the duty ratio of the drive signal (DV, #DV).

10 Claims, 8 Drawing Sheets leftward motion rightward motion stop

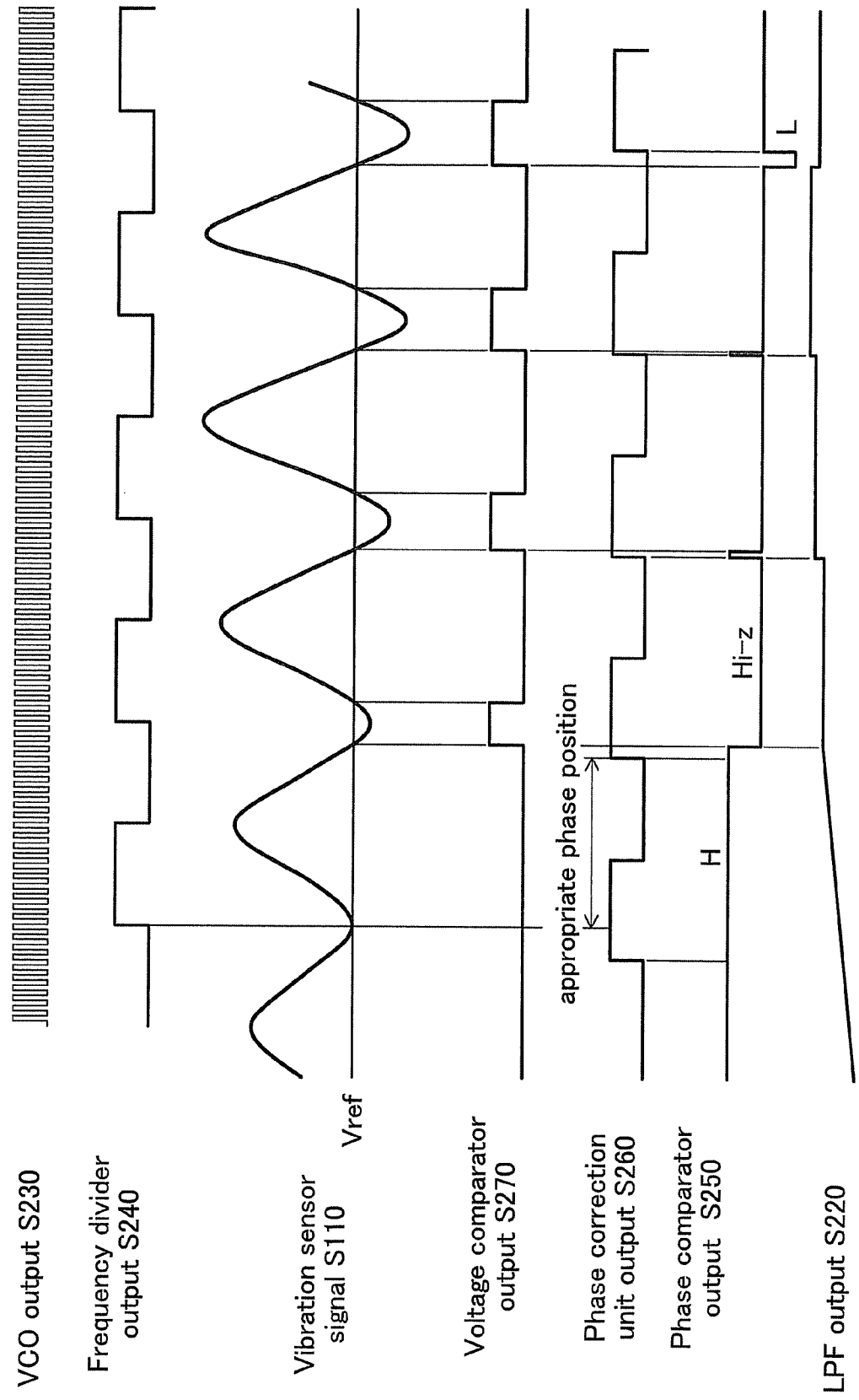

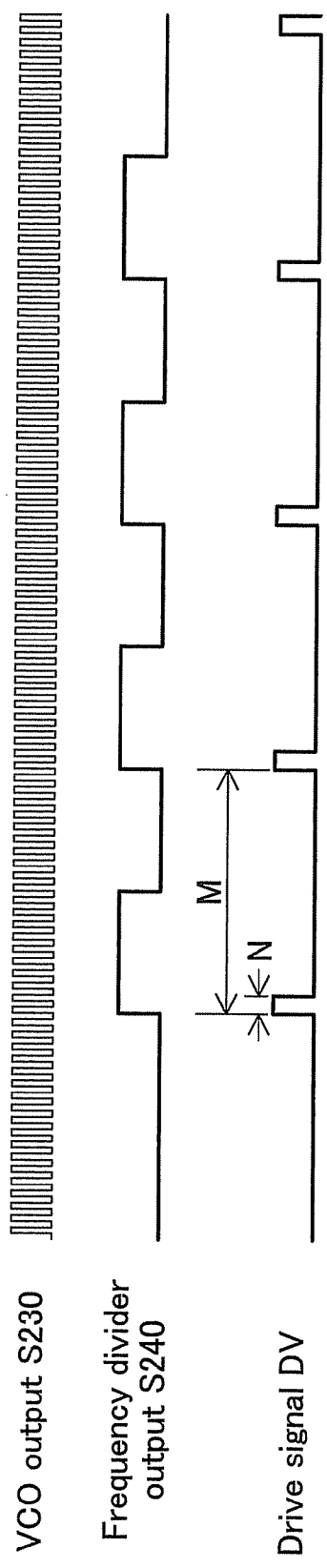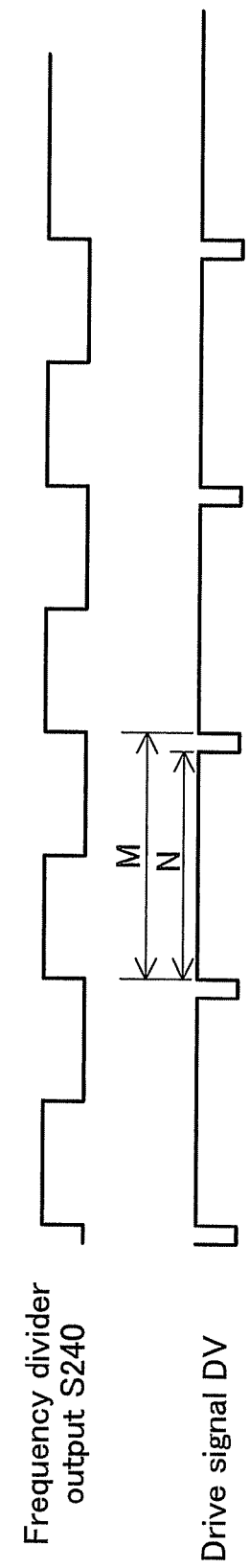

PIEZOELECTRIC ACTUATOR AND METHOD FOR DRIVING THE SAME

CROSS-REFERENCE TO RELATED APPLICATIONS

The present application claims the priority based on Japanese Patent Application No. 2007-151059 filed on Jun. 7, 2007, the disclosure of which is hereby incorporated by reference in its entirety.

BACKGROUND OF THE INVENTION

1. Field of the Invention

The present invention relates to a piezoelectric actuator and to a method for driving the same.

2. Description of the Related Art

A piezoelectric actuator is disclosed, for example, in JP2004-266943A. This piezoelectric actuator utilizes a expansion and contraction of piezoelectric elements (also termed "piezo elements") to drive a driven body.

However, a problem with conventional piezoelectric actuators is that in order to drive the driven body in the opposite direction it is necessary to switch the piezoelectric element to which the drive signal is supplied.

SUMMARY OF THE INVENTION

An object of the present invention is to provide technology for changing the drive direction of a driven body without the need to switch the piezoelectric element to which the drive signal is supplied.

According to an aspect of the present invention, there is provided a piezoelectric actuator for driving a driven body. The piezoelectric actuator includes: a piezoelectric element structure having at least one piezoelectric element and a working edge for directing driving force to act on the driven body, wherein the working edge oscillates in response to deformation of the piezoelectric element; a driver circuit for applying voltage to the piezoelectric element; and a drive control circuit for inducing oscillation of the working edge by supplying a drive signal of rectangular waveform to the driver circuit. The drive control circuit is capable of reversing the drive direction of the driven body through a change in a duty ratio of the drive signal With this configuration, since the drive direction of the driven body can be reversed by changing the duty ratio of the drive signal, it is possible to changing the drive direction of the driven body without the need to switch the piezoelectric element to which the drive signal is supplied.

The present invention may be reduced to practice in various forms, for example, as a piezoelectric actuator; a method and a device for controlling the same; devices of various kinds employing a piezoelectric actuator; and so on.

BRIEF DESCRIPTION OF THE DRAWINGS

FIG. 4 is a timing chart showing operation of the drive control circuit;

FIGS. 5A and 5B are timing charts depicting operation of a duty controller;

DESCRIPTION OF THE PREFERRED EMBODIMENT

Embodiments of the present invention will be described in the following order.
A. Embodiment 1
B. Other Embodiments
C. Modification Examples

A. Embodiment 1

Figure 1A:
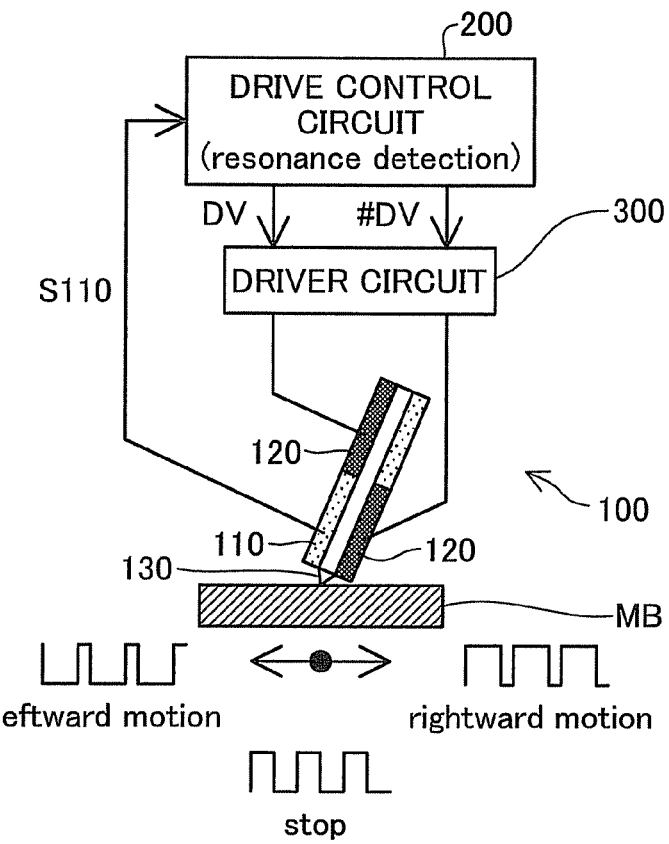
FIGS. 1A and 1B show an overview of configuration and operation of a piezoelectric actuator in Embodiment 1 of the present invention.

FIG. 1A is a conceptual diagram depicting a configuration of a piezoelectric actuator pertaining to a first embodiment of the present invention. This piezoelectric actuator includes a piezoelectric element structure 100 for driving a driven body MB; a drive control circuit 200 for controlling operation of the piezoelectric element structure 100; and a driver circuit 300 for supplying driving voltage to the piezoelectric element structure 100 in response to a drive signal DV or #DV from the drive control circuit 200. The drive signal #DV whose symbol is prefixed by a "#" indicates that the signal is derived by inverting the drive signal DV. The entire circuit which includes the drive control circuit 200 and the driver circuit 300 functions as a driver unit for driving the piezoelectric element structure 100. This driver unit may be implemented as a semiconductor integrated circuit (IC).

The piezoelectric element structure 100 has one or more piezoelectric elements 120, an oscillation sensor 110 used for detecting oscillation, and a working edge 130. In the example of FIG. 1A, the piezoelectric element structure 100 is positioned inclined with respect to the driven body MB; however, it may be positioned upright instead.

As the piezoelectric element 120 expands or contracts in response to the drive signal DV, #DV, the piezoelectric element structure 100 oscillates as a whole, and in response the working edge 130 oscillates as well. The working edge 130 is pressed against the driven body MB, and when the working edge 130 oscillates, driving force for the driven body MB will be generated. The oscillation sensor 110 supplies its sensor output S110 to the drive control circuit 200. The drive control circuit 200 has the function of detecting oscillation of the piezoelectric element structure 100 at the resonance frequency, in response to this oscillation sensor output S110. Also, it is possible for the drive control circuit 200 to make the piezoelectric element structure 100 oscillate at the resonance frequency, by generating drive signals DV, #DV having the resonance frequency.

The drive control circuit 200 is further able to reverse the driving direction of the driven body MB by changing the duty ratio of the drive signal DV, #DV. For example, the driven body MB can be moved leftward by setting the duty ratio to a value of less than 50%, while the driven body MB can be moved rightward by setting the duty ratio to a value of more than 50%. It is also possible to stop the driven body MB by setting the duty ratio to exactly 50%.

Figure 1B:
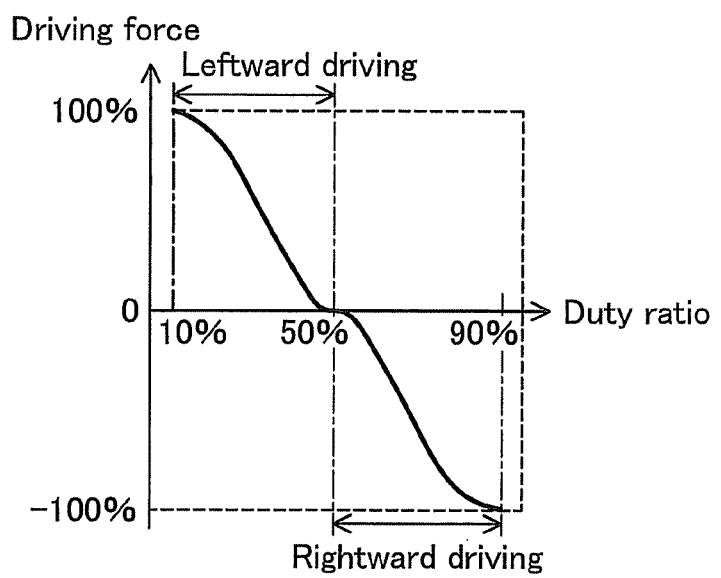

FIG. 1B is a graph depicting the relationship of duty ratio of the drive signal and driving force. Driving force is given on the vertical axis; the plus side indicates generation of leftward driving force, while the minus side indicates generation of rightward driving force. According to this characteristic, when the duty ratio is 50%, no driving force is generated, and it goes to zero. When the duty ratio assumes a value of less than 50%, driving force is generated in the leftward direction. On the other hand, when the duty ratio assumes a value of more than 50%, driving force is generated in the rightward direction. This characteristic is a nonlinear characteristic which exhibits smaller slope as the duty ratio approaches 50% and greater slope as the duty ratio moves further away from 50%. By utilizing this sort of characteristic, it will be easy to bring the driven body MB to a stop by maintaining the duty ratio in proximity to 50%. The characteristic also exhibits symmetry about the location at which the duty ratio is 50% (the center point). Utilizing this sort of characteristic has the advantage that driving direction and driving force can be easily controlled.

In the example of FIG. 1B, a duty ratio range of between 10% and 90% is used as the effective driving range, but ranges outside of this (i.e. duty ratio ranges of less than 10% or more than 90%) are not utilized. The reason is that as the duty ratio approaches 0% or approaches 100%, the voltage applied to the piezoelectric element 120 assumes a waveform which approximates a constant DC voltage, causing the piezoelectric element 120 not to expand or contract sufficiently and not to generate oscillation. The drive characteristics representing the relationship of duty ratio and driving force, and an effective driving range for these characteristics, will be determined experimentally depending on the specific individual structure of the piezoelectric element structure 100.

Figure 2:
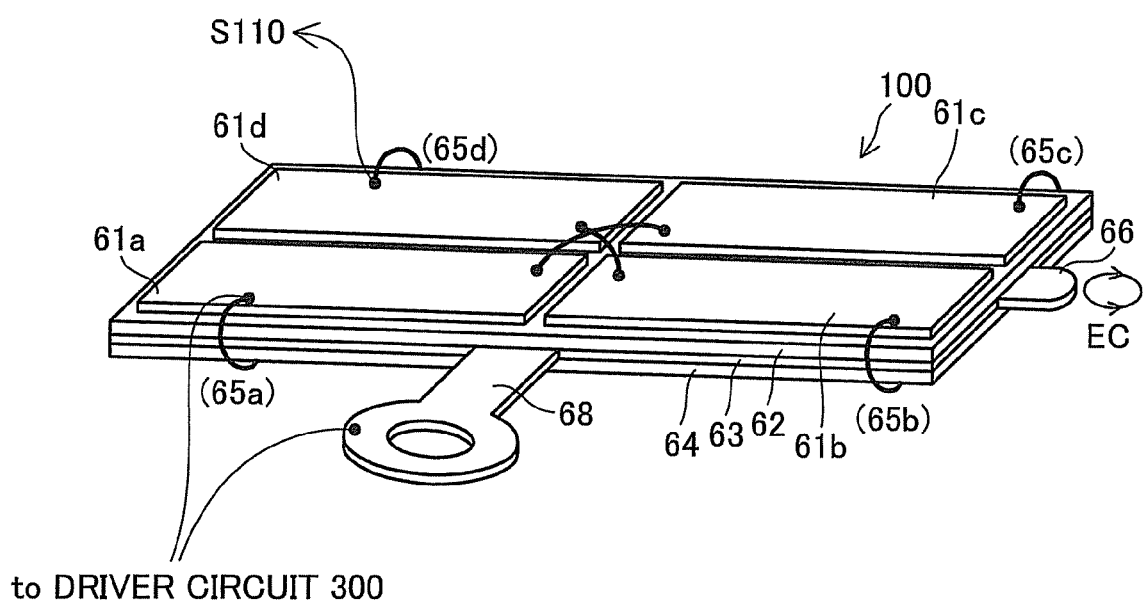
FIG. 2 is a perspective view depicting an exemplary piezoelectric element structure.

FIG. 2 is a perspective view depicting an exemplary specific structure of the piezoelectric element structure 100. This piezoelectric element structure 100 has a stacked arrangement in which a reinforcing plate 63 is sandwiched by a pair of piezoelectric elements 62, 64. On the upper surface of the piezoelectric actuator 62 are arranged four electrodes 61a through 61d of generally rectangular tabular shape. Similarly, four electrodes 65a through 65d of generally rectangular tabular shape (not shown in the drawing) are arranged on the bottom surface of the piezoelectric actuator 64 at locations corresponding to the electrodes 61a through 61d. Since the upper half and the lower half of the piezoelectric element structure 100 have mirror-symmetric structure, the following discussion will focus primarily on the structure of the upper half.

The reinforcing plate 63 has a generally oblong tabular structure, and in preferred practice will be thinner than each of the piezoelectric elements 62, 64. This has the advantage of allowing the piezoelectric element structure 100 to oscillate with high efficiency. It is possible for the reinforcing plate 63 to be made of stainless steel, aluminum, aluminum alloy, titanium, titanium alloy, copper, copper alloy, or other metal material. The reinforcing plate 63 has the function of reinforcing the piezoelectric element structure 100 as a whole, and serves to prevent damage to the piezoelectric element structure 100 caused by excessive vibration, external shocks, or the like. The reinforcing plate 63 also functions as a common electrode for conduction between the piezoelectric elements 62, 64.

The piezoelectric element structure 100 has a working edge 66 situated at the center of one short side, i.e. in the center of a distal edge portion in the lengthwise direction. This working edge 66 is a component which functions as the working edge 130 of FIG. 1A. The piezoelectric element structure 100 also has a fixation member 68 situated at the center of one long side, i.e. in the center of a side in the lengthwise direction, and projecting approximately perpendicular to the long side. This fixation member 68 is a component used when installing the piezoelectric element structure 100. The working edge 66 and the fixation member 68 may be integrally formed as a single component with the reinforcing plate 63. In this case, the working edge 66 and the fixation member 68 may be covered entirely or in part with an insulating layer. Alternatively, the working edge 66 and the fixation member 68 may be constituted as separate components from the reinforcing plate 63, which functions as a common electrode.

The piezoelectric elements 62, 64 have oblong tabular structure generally congruent with the reinforcing plate 63. The piezoelectric elements 62, 64 are affixed to the reinforcing plate 63 and unified therewith to constitute a unitary structure. This offers the advantage of being able to improve the strength of the piezoelectric element structure 100. The piezoelectric elements 62, 64 are made of material capable of expanding and contracting through application of voltage. Examples of such materials are lead zirconate titanate, quartz crystal, lithium niobate, barium titanate, lead titanate, lead metaniobate, polyvinylidene fluoride, lead zinc niobate, lead scandium niobate, and the like.

The four electrodes 61a through 61d which are arranged on the outside face of the piezoelectric element 62 are made of metal components of strip shape, and are arranged at prescribed locations on the piezoelectric element 62. In the example of FIG. 2, these electrodes have length approximately equal to one-half that of the long sides of the piezoelectric element 62, and are arranged in sets of two in the lengthwise direction along the long edges of the piezoelectric element 62. The electrodes 61a through 61d are thereby arrayed in a group of four on the piezoelectric element 62, positioned symmetrically to one another with respect to the lengthwise centerline and the widthwise centerline of the piezoelectric element 62.

The electrodes 61a through 61d on the upper face and the electrodes 65a through 65d on the lower face are positioned at mutually opposed locations on the front and back of the piezoelectric element structure 100. Electrodes at corresponding locations on the upper face side and the lower face side (e.g. the electrodes 61a and 65a) are electrically connected to one another. Electrodes located on the diagonal on the piezoelectric element 62 (e.g. the electrodes 61a and 61c, and the electrodes 61b and 61d) are also electrically connected to one another. The electrode 61a and the fixation member 68 (the common electrode) are coupled to the driver circuit 300; these electrodes 61a, 68 are supplied with driving voltage by the driver circuit 300. The output signal S110 which represents oscillation of the piezoelectric element structure 100 is output to the drive control circuit 200. Specifically, it will be appreciated that the electrodes 61b, 61d, 65b, 65d and the piezoelectric elements 62, 64 as a whole function as the oscillation sensor 110.

When driving voltage is applied to the driving electrodes 61a, 68, the piezoelectric elements 62, 64 in the sections thereof where the electrodes 61a, 61c, 65a, 65c are located will experience rapid and repetitive stretching and contraction in the lengthwise direction of the piezoelectric element structure 100. As a result, the working edge 66 of the piezoelectric element structure 100 will oscillate and move along an elliptical path EC shown in the drawing. It should be noted that the direction of motion along this elliptical path EC will reverse depending on the duty ratio of the drive signal DV, #DV (FIG. 1B). The driven body MB (FIG. 1B) is driven by receiving the driving force produced by this motion of the working edge 66. Operation of the piezoelectric element structure 100 is described in U.S. Pat. No. 7,116,038, the disclosure of which is hereby incorporated by reference in its entirety.

Figure 3:
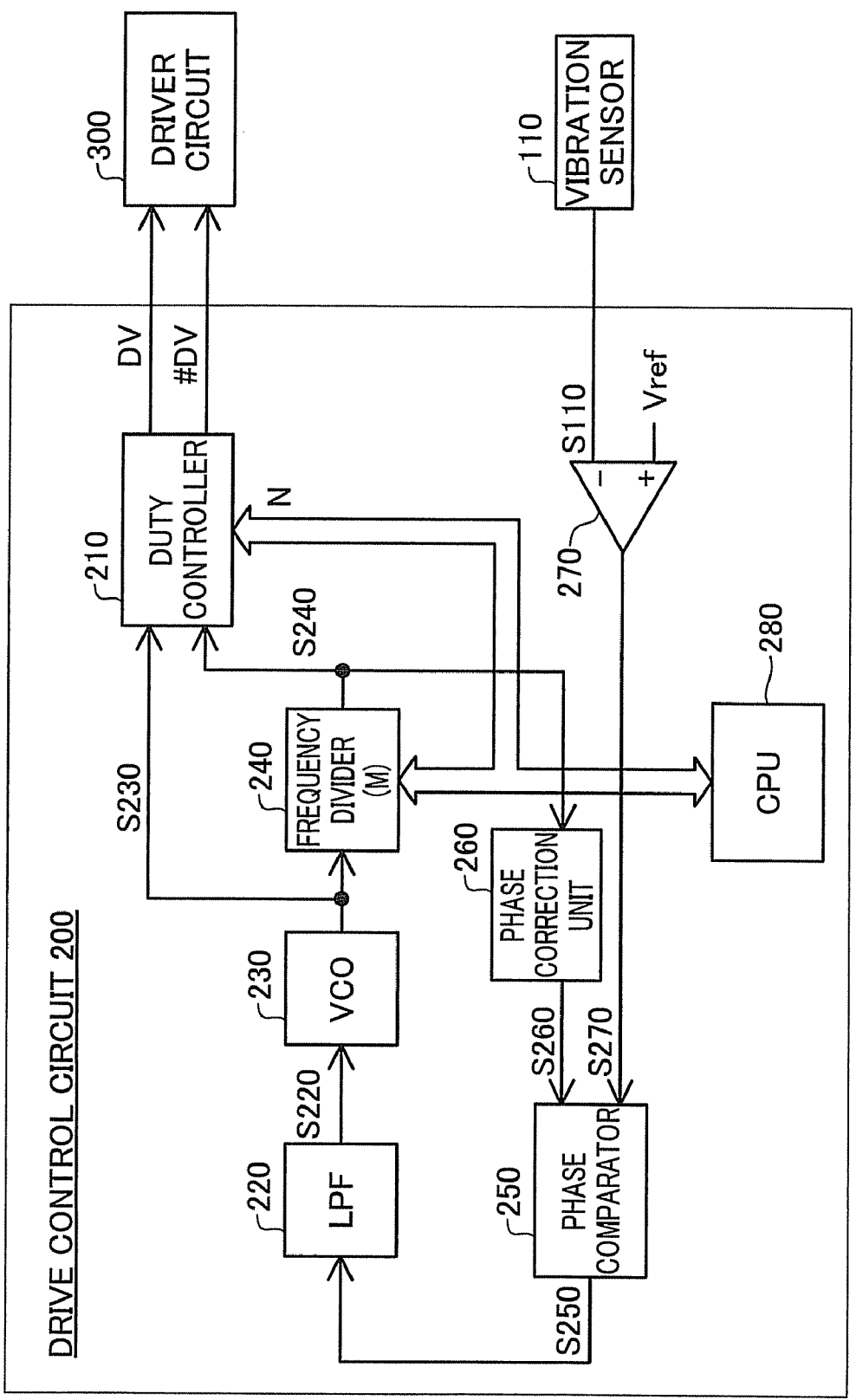
FIG. 3 is a block diagram depicting internal configuration of a drive control circuit.

FIG. 3 is a block diagram depicting the internal configuration of the drive control circuit 200. The drive control circuit 200 has a duty controller 210, a loop filter (LPF) 220, a voltage controlled oscillator (VCO) 230, a frequency divider 240, a phase comparator 250, a phase correction unit 260, a voltage comparator 270, and a CPU 280. The LPF 220, the VCO 230, the frequency divider 240 and the phase comparator 250 make up a so-called PLL circuit.

The voltage comparator 270 compares the oscillation sensor output S110 with a prescribed reference voltage Vref, and generates a signal S270 indicating the result. This signal S270 is input to the phase comparator 250 together with the output signal S260 from the phase correction unit 260. As will be discussed later, the output signal S260 of the phase correction unit 260 represents the phase-corrected form of the signal S240 output by the frequency divider 240. The output S250 of the phase comparator 250 is input to the LPF 220, and the output S220 of the LPF 220 is input to the VCO 230. The output S230 of the VCO 230 is supplied to the frequency divider 240 and to the duty controller 210. The output S240 of the frequency divider 240 is supplied to the duty controller 210 and to the phase correction unit 260. The duty controller 210 generates the drive signals DV, #DV on the basis of the output signal S230 of the VCO 230, the output signal S240 of the frequency divider 240, and a duty value N instructed by the CPU 280. These drive signals DV, #DV are then supplied to the driver circuit 300.

FIG. 4 is a timing chart showing operation of the drive control circuit 200. The VCO output S230 is a clock signal of rectangular waveform. The frequency divider output S240 is a clock signal derived by 1/M frequency division of the VCO output S230. The oscillation sensor output S110 is a signal of generally sine wave shape, for example, and which changes over time. The voltage comparator output S270 goes to H level when the oscillation sensor output S110 is smaller than the reference voltage Vref, and to L level when greater than the reference voltage Vref. However, the voltage comparator 270 and the reference voltage Vref may be set such that the voltage comparator output S270 goes to H level when the oscillation sensor output S110 is greater than the reference voltage Vref.

By delaying the phase of the frequency divider output S240, the phase correction unit 260 generates an output S260 having a rising edge at the appropriate phase position. Here, "appropriate phase position" refers to an appropriate position that makes it possible to detect the resonant condition of the piezoelectric element structure 100 as the result of comparison of the phase correction unit output S260 and the voltage comparator output S270 in the phase comparator 250. The amount of delay imparted by the phase correction unit 260 may be preset to an appropriate value with reference to delay of circuit elements within the drive control circuit 200 or other considerations.

The phase comparator output S250 can assume H level, a high-impedance state (labeled "Hi-z" in the drawing), and L level. With the phase comparator output S250 in the high-impedance state, a rising edge of the phase correction unit output S260 will cause the phase comparator output S250 to rise to H level. A subsequent rising edge of the voltage comparator output S270 will bring about a return to the high-impedance state. Meanwhile, with the phase comparator output S250 in the high-impedance state, a rising edge of the voltage comparator output S270 will cause the phase comparator output S250 to fall to L level; and a subsequent rising edge of the phase correction unit output S260 will return the phase comparator output S250 to the high-impedance state. In this way, the phase comparator output S250 is a signal which indicates the result of comparing the phase of the two signals S260, S270. When the phase comparator output S250 is H level the LPF output S220 will increase, while when it is L level the LPF output S220 will decrease. The VCO output 230 is a clock signal of frequency proportional to this LPF output S220. In FIG. 4, the VCO output S230 and the frequency divider output S240 appear to have constant frequency, but actually the frequency of these signals S230 and S240 will increase in association with increase of the LPF output S220.

When the piezoelectric element structure 100 resonates, the amplitude of the oscillation sensor signal S110 will increase, and in association therewith the frequencies of the VCO output S230 and the frequency divider output S240 will increase as well. This will result in a state in which the frequency and phase of the oscillation sensor signal S110 and the frequency divider output S240 match, and in which the VCO output S230 has a stabilized frequency. It can be appreciated that the frequency divider output S240 is generated as a signal having the resonance frequency of the piezoelectric element structure 100. In this way, the drive control circuit 200 functions as a circuit for detecting resonance of the piezoelectric element structure 100, as well as for generating a signal S240 having that resonance frequency. In preferred practice, the LPF 220 will be designed so as to supply the VCO 230 with a prescribed non-zero initial voltage at startup as well. By so doing it will be possible at startup for a VCO output S230 having prescribed initial frequency to be generated from the VCO 230. On the basis of the VCO output S230 and the frequency divider output S240 obtained in this way, the duty controller 210 will generate the drive signals DV, #DV in the following manner.

FIGS. 5A and 5B are timing charts depicting operation of the duty controller 210. The drive signal DV generated by the duty controller 210 rises to H level in response to the rising edge of the frequency divider output S240, and subsequently drops to L level after N pulses of the VCO output S230. Consequently, the drive signal DV will be a signal having the same frequency as the frequency divider output S240, with a duty ratio of N/M. FIG. 5A depicts a case where the duty ratio N/M is less than 50%; FIG. 5B depicts a case where the duty ratio N/M is more than 50%. The duty controller 210 for carrying out this sort of operation can be constructed using counters.

Figure 6:
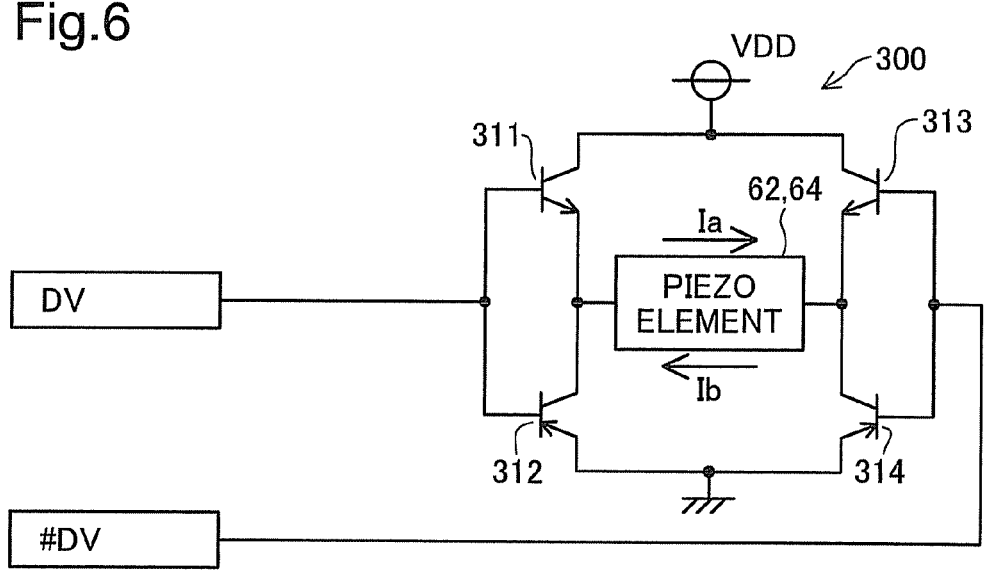
FIG. 6 is a circuit diagram showing an example of a driver circuit.

FIG. 6 is a circuit diagram showing an example of the driver circuit 300. This driver circuit 300 is an H bridge circuit composed of four switching transistors 311 through 314. The upper arm transistors 311, 313 are transistors of opposite type from the lower arm transistors 312, 314 (here, npn type and pnp type respectively). The drive signal DV is input in common to the control terminals of the two transistors 311, 312 on the left side. The inverted drive signal #DV is input in common the control terminals of the two transistors 313, 314 on the right side. When the drive signal DV assumes the On state, electrical current Ia will flow in a prescribed direction to the piezoelectric elements 62, 64; on the other hand when the drive signal DV assumes the Off state, electrical current Ib will flow in the opposite direction to the piezoelectric elements 62, 64. Consequently, when a signal of rectangular waveform is input as the drive signal DV, rectangular voltage will be applied, electrical current Ia, Ib will flow in alternating fashion, and the piezoelectric elements 62, 64 will expand and contract accordingly.

Figure 7:
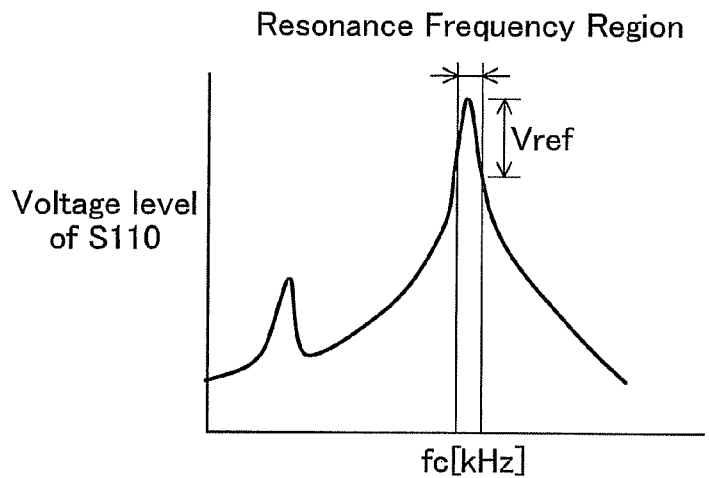
FIG. 7 is a graph depicting the relationship between oscillation frequency fc of a piezoelectric element structure and voltage level of oscillation sensor output S110.

FIG. 7 shows the relationship between oscillation frequency fc of the piezoelectric element structure 100 and voltage level of the oscillation sensor output S110. In the resonance frequency region, the oscillation sensor output S110 exhibits a high value. The reference voltage Vref of the voltage comparator 270 (FIG. 3) has been preset to a value within the voltage level range of the oscillation sensor output S110 of this resonance frequency region. Consequently, it is possible for the drive control circuit 200 to generate the frequency divider output S240 and the drive signals DV, #DV as signal having the resonance frequency.

In this way, the piezoelectric actuator of the present embodiment allows the direction of driving force acting on the driven body MB from the piezoelectric element structure 100 to be reversed simply by changing the duty ratio of the drive signal DV. It is accordingly possible to drive the driven body MB in both the forward direction and the reverse direction, using a simple structure.

B. Other Embodiments

Figure 8:
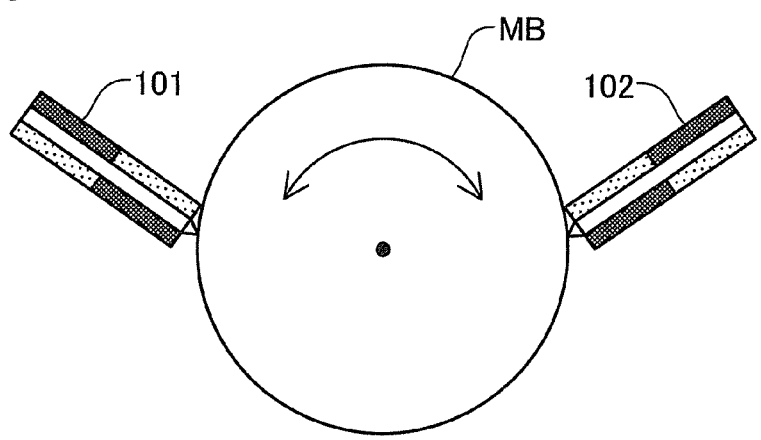
FIG. 8 illustrates the relationship of piezoelectric element structures and a driven body in a second embodiment.

FIG. 8 is an illustration depicting the relationship of piezoelectric element structures and a driven body in a second embodiment. Here, two piezoelectric element structures 101, 102 are disposed to either side of a driven body MB of disk shape. The piezoelectric element structures 101, 102 have identical structure; structures identical to that depicted in FIG. 2 may be employed, for example. The driven body MB is capable of turning both rightward and leftward under driving force from the two piezoelectric element structures 101, 102. The reason for disposing the two piezoelectric element structures 101, 102 to opposite sides of the driven body MB is to balance the driving force applied to the driven body MB to that it can turn more smoothly.

Figure 9:
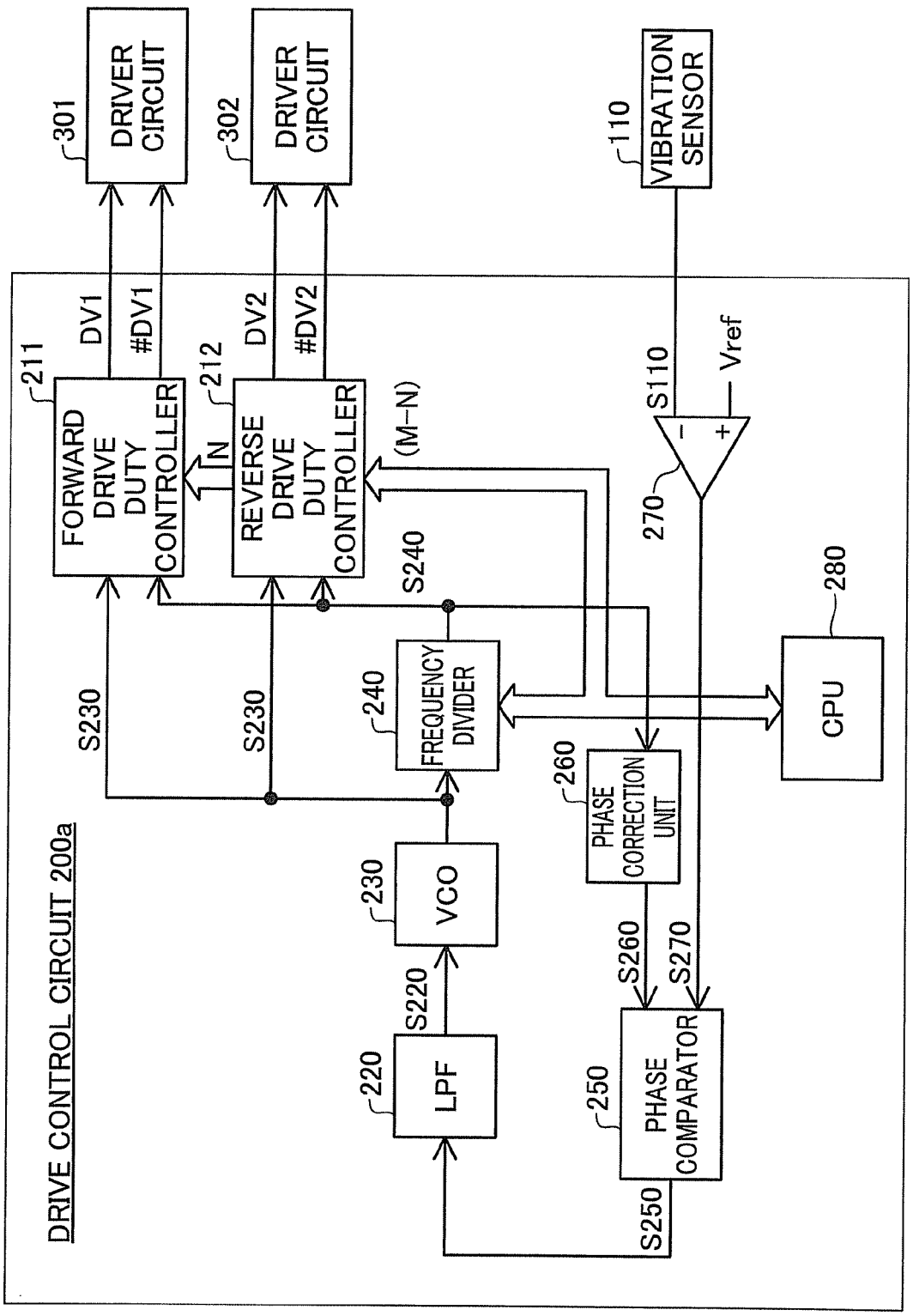
FIG. 9 is a block diagram depicting a drive unit in Embodiment 2.

FIG. 9 is a block diagram depicting the drive unit in Embodiment 2. In the drive control circuit 200a, the duty controller 210 of the circuit 200 shown in FIG. 3 has been replaced with a forward drive duty controller 211 and a reverse drive duty controller 212. Two driver circuits 301, 302 are provided for these duty controllers 211, 212. These two driver circuits 301, 302 are circuits for the purpose of driving the two piezoelectric element structures 101, 102.

The forward drive duty controller 211 generates a drive signal DV1 of duty ratio N/M. This is the same as the operation described in FIGS. 5A and 5B. The reverse drive duty controller 212, on the other hand, generates a drive signal DV2 of duty ratio (M−N)/M. The duty ratios N/M and (M−N)/M used by the two duty controllers 211 and 212 are values of equal difference from 50%. Specifically, when the first duty ratio N/M is (50−α)% the second duty ratio (M−N)/M will be (50+α)%. As discussed in FIG. 1B, the characteristic representing the relationship of duty ratio and driving force is symmetrical about the location of the duty ratio of 50%; thus, where the two piezoelectric element structures 101, 102 are driven at the same time by the drive signals DV1, DV2 having these duty ratios N/M and (M−N)/M, it will be possible to selectively turn the driven body MB in either the rightward or the leftward direction.

Figure 10:
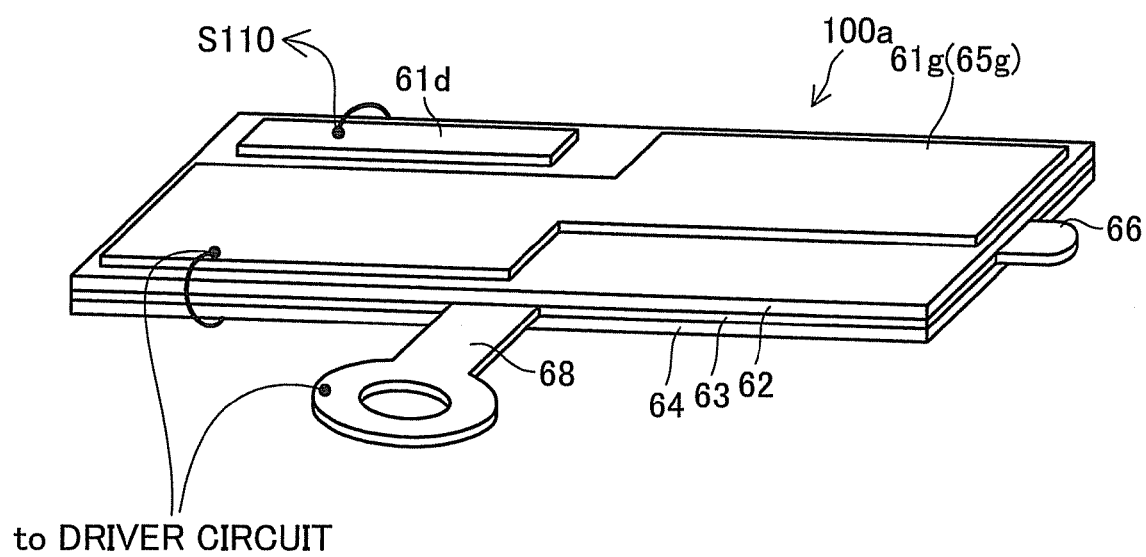
FIG. 10 is a perspective view depicting another piezoelectric element structure.

FIG. 10 shows another structural example of piezoelectric element structure. In this piezoelectric element structure 100a the electrodes 61a, 61c of the piezoelectric element structure 100 shown in FIG. 2 have been replaced with a single electrode 61g which is equivalent to the sum of the electrodes 61a, 61c. An electrode 65g identical in shape to this electrode 61g is disposed on the back face side. The electrode 61d is somewhat smaller in planar dimensions than that in FIG. 2, and the electrode 61b of FIG. 2 has been omitted altogether. It will be possible to drive a driven body in both the forward direction and the reverse direction utilizing oscillation of the piezoelectric element of the piezoelectric element structure 100a of this embodiment, like the piezoelectric element structure 100 shown in FIG. 2,. These two types of piezoelectric element structures are common in that they include two generally rectangular tabular piezoelectric elements 62, 64; a common electrode 68 intervening between the two piezoelectric elements 62, 64; and interconnected electrodes 61a, 61c, 65a, 65d (or 61g, 65g) disposed at corresponding locations on the outside faces of the two piezoelectric elements 62, 64. These electrodes 61a, 61c, 65a, 65d (or 61g, 65g) are positioned along one of the two diagonals on the surface of the piezoelectric elements 62, 64. It would be possible to employ any structure besides those shown in FIG. 2 and FIG. 10 as the piezoelectric element structure; a piezoelectric element structure that includes one or more piezoelectric elements and has a working edge that oscillates in response to deformation of the piezoelectric element may be employed. In preferred practice the working edge will move along an elliptical path during oscillation.

C. MODIFICATION EXAMPLES

The present invention is not limited by the embodiments set forth hereinabove by way of illustration, and various other embodiments such as the following are possible within the scope and spirit thereof, such as the following modifications.

C1. Modification Example 1

In the preceding embodiments, the configuration of the drive control circuit is adapted to be able to detect the resonant condition of the piezoelectric element structure; however, it is possible to instead utilize a circuit that generates a drive signal having constant frequency equal to a pre-calculated resonance frequency, without detecting the resonant condition. However, the preceding embodiments have the advantage that the piezoelectric element structure can be made to resonate consistently even if the resonance frequency of individual piezoelectric element structures varies due to manufacturing error or environmental factors (e.g. temperature).

C2. Modification Example 2

Characteristics besides that shown in FIG. 1B may be used as the relationship between drive signal duty ratio and driving force. For example, in some instances the value of duty ratio producing a reversal of driving force may be a value other than 50%. For example, where the piezoelectric element structure 100 has been positioned on an incline with respect to the driven body MB as depicted in FIG. 1A, it is possible that the duty ratio value producing a reversal of driving force will be offset from 50%. The magnitude of driving force need not necessarily have the same value in the leftward and rightward directions, and some differences between the leftward and rightward directions are acceptable.

What is claimed is:
1. A piezoelectric actuator that drives a driven body, comprising:
   a piezoelectric element structure having at least one piezoelectric element and a working edge that directs driving force to act on the driven body, wherein the working edge oscillates in response to deformation of the piezoelectric element;
a driver circuit that applies voltage to the piezoelectric element; and
a drive control circuit that includes oscillation of the working edge by supplying a drive signal of rectangular waveform to the driver circuit,
wherein the drive control circuit reverses the drive direction of the driven body through a change in a duty ratio of the drive signal.

2. The piezoelectric actuator according to claim 1, wherein the drive control circuit:
(i) drives the driven body in a first direction by setting the duty ratio of the drive signal to a value less than 50%;
(ii) stops the driven body by setting the duty ratio of the drive signal to 50%; and
(iii) drives the driven body in a second direction opposite the first direction by setting the duty ratio of the drive signal to a value exceeding 50%.

3. The piezoelectric actuator according to claim 2, wherein relationship between the duty ratio of the drive signal and driving force of the working edge shows a non-linear characteristic exhibiting a smaller slope of change of the driving force where the duty ratio is close to 50%, and a larger slope of change of the driving force at locations where the duty ratio is further away from 50%.

4. The piezoelectric actuator according to claim 1, wherein the piezoelectric element structure has a sensor that detects oscillation of the piezoelectric element structure, and the drive control circuit includes:
a resonance frequency signal generator that generates, in response to a sensor output of the sensor, a resonance frequency signal having a resonance frequency at which the piezoelectric element structure resonates; and
a duty controller that generates the drive signal so as to have the same frequency as the resonance frequency signal, and have a duty ratio dependent on the driving direction of the driven body.

5. The piezoelectric actuator according to claim 1, wherein the piezoelectric element structure includes:
two piezoelectric elements of generally rectangular tabular shape;
a common electrode interposed between the two piezoelectric elements; and
first and second electrodes which are interconnected and disposed at corresponding locations on outside faces of the two piezoelectric elements,
and wherein the first and second electrodes are positioned along one of the two diagonals on the outside surfaces of the piezoelectric elements.

6. A method that drives a piezoelectric actuator that drives a driven body, the piezoelectric actuator having at least one piezoelectric element and a working edge that directs driving force to act on the driven body, the working edge oscillating in response to deformation of the piezoelectric element, the method comprising:
reversing a drive direction of the driven body through a change in a duty ratio of a drive signal that drives the piezoelectric element.

7. The method according to claim 6, further comprising:
(i) driving the driven body in a first direction by setting the duty ratio of the drive signal to a value less than 50%;
(ii) stopping the driven body by setting the duty ratio of the drive signal to 50%; and
(iii) driving the driven body in a second direction opposite the first direction by setting the duty ratio of the drive signal to a value exceeding 50%.

8. The method according to claim 7, wherein
relationship between the duty ratio of the drive signal and driving force of the working edge shows a non-linear characteristic exhibiting a smaller slope of change of the driving force where the duty ratio is close to 50%, and a larger slope of change of the driving force at locations where the duty ratio is further away from 50%.

9. The method according to claim 6, wherein
the piezoelectric element structure has a sensor that detects oscillation of the piezoelectric element structure, and the method further comprises:
generating, in response to a sensor output of the sensor, a resonance frequency signal having a resonance frequency at which the piezoelectric element structure resonates; and
generating the drive signal so as to have the same frequency as the resonance frequency signal, and have a duty ratio dependent on the driving direction of the driven body.

10. The method according to claim 9, wherein
the piezoelectric element structure includes:
two piezoelectric elements of generally rectangular tabular shape;
a common electrode interposed between the two piezoelectric elements; and
first and second electrodes which are interconnected and disposed at corresponding locations on outside faces of the two piezoelectric elements,
and wherein the first and second electrodes are positioned along one of the two diagonals on the outside surfaces of the piezoelectric elements.

* * * * *